(12) United States Patent
Cornea et al.

(10) Patent No.: US 6,892,759 B2
(45) Date of Patent: May 17, 2005

(54) VALVE HAVING AT LEAST ONE SCREEN

(75) Inventors: Marius Cornea, Lohr/Main (DE);
Lorenz Lippert, Gemunden (DE);
Bernd Weigand, Lohr/Main (DE);
Andreas Knecht, Kusterdingen (DE)

(73) Assignee: Hydraulik-Ring GmbH, Marktheidenfeld (DE)

( * ) Notice: Subject to any disclaimer, the term of this patent is extended or adjusted under 35 U.S.C. 154(b) by 0 days.

(21) Appl. No.: 10/248,096

(22) Filed: Dec. 18, 2002

(65) Prior Publication Data
US 2004/0118459 A1 Jun. 24, 2004

(51) Int. Cl.⁷ ................................................ E03B 3/18
(52) U.S. Cl. ..................... 137/550; 137/544; 251/366
(58) Field of Search .................... 251/366; 137/544, 137/550

(56) References Cited

U.S. PATENT DOCUMENTS

| | | | | |
|---|---|---|---|---|
| 1,420,073 A | * | 6/1922 | Babcock | 137/550 |
| 2,217,056 A | * | 10/1940 | Johnson | 137/550 |
| 4,575,364 A | * | 3/1986 | Lamers | 474/16 |
| 6,220,283 B1 | * | 4/2001 | Saarinen et al. | 137/550 |

* cited by examiner

Primary Examiner—A. Michael Chambers
(74) Attorney, Agent, or Firm—Gudrun E. Huckett

(57) ABSTRACT

A valve has a valve housing having a flow path for a medium with at least one bore. At least one screen is arranged in the flow path of the medium in the valve housing. The screen is a perforated plate having screen openings and is made of a strap. The valve housing has at least one annular channel and the screen is arranged on a support surface provided in the annular channel.

10 Claims, 1 Drawing Sheet

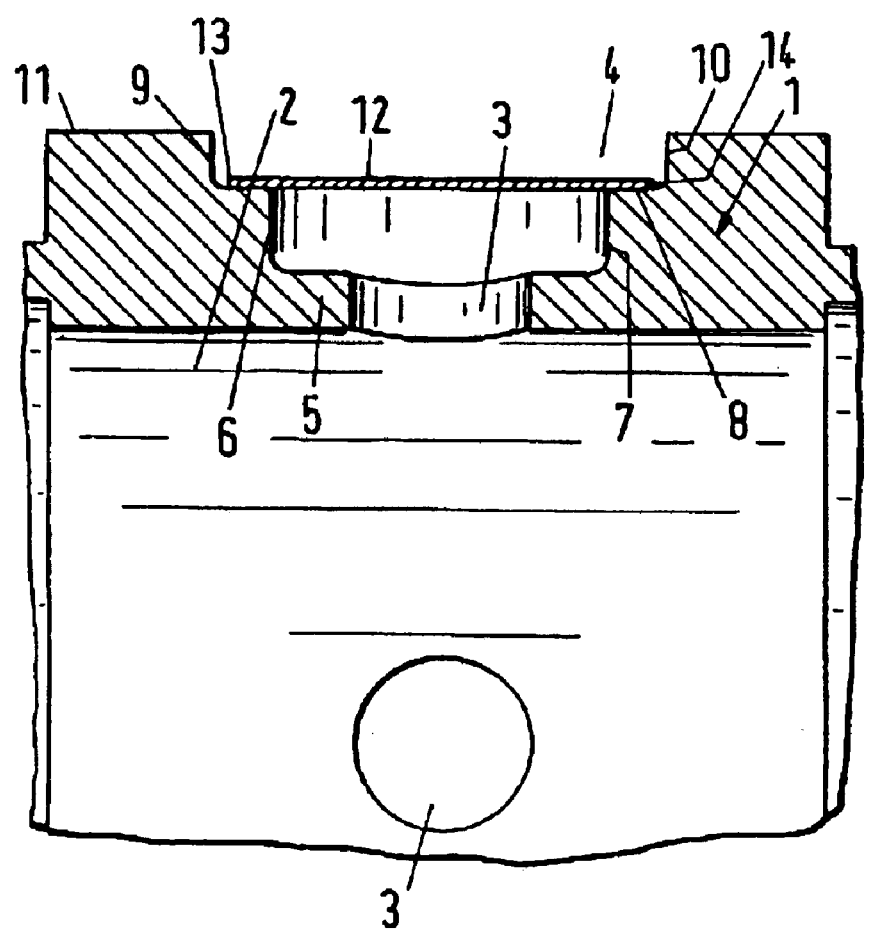

VALVE HAVING AT LEAST ONE SCREEN

BACKGROUND OF THE INVENTION

1. Field of the Invention

The invention relates to a valve comprising at least one bore and at least one screen in the flow path of the medium.

2. Description of the Related Art

Filters or screens are inserted into such valves, and the hydraulic medium flows through them so that dirt particles contained in the hydraulic medium are retained therein. These filters or screens are made of plastic material, woven material or wire mesh and are inserted or mounted in the valve housing radially or axially. These filters are embedded or enclosed in plastic material by injection molding in order to provide them with shape stability. This manufacturing-method makes the filter or screen comparatively expensive.

SUMMARY OF INVENTION

It is an object of the present invention to configure the valve of the aforementioned kind such that the screen can be manufactured inexpensively.

In accordance with the present invention, this is achieved in that the screen is a perforated plate having screen openings.

The screen in the valve according to the invention is embodied by a perforated plate (perforated sheet metal). It is stiff (shape-stable) in itself and must therefore not be enclosed in plastic material by injection molding. In this way, the screen can be manufactured inexpensively. The screen openings in the perforated plate or sheet metal are selected such that the dirt particles contained in the medium are reliably retained. Conventionally, the diameter of the screen openings is in the range of approximately $100 \mu m$ to $300 \mu m$. The screen requires only a small mounting space so that the use of such screens does not enlarge the size of the valve. Advantageously, the screen is provided in an annular channel which is present in such a valve housing anyway.

BRIEF DESCRIPTION OF DRAWINGS

FIG. 1 shows partially in section a housing of a valve according to the invention with inserted screen.

DETAIL DESCRIPTION

The only FIGURE shows, partially in section, a valve housing 1 of the valve according to the invention. The housing 1 has an axial bore 2 in which a piston (not illustrated) is movably arranged while sealing relative to the bore. The valve is advantageously a cartridge valve. However, the valve can also have a valve configuration of a different type. The valve housing 1 has radial bores 3 which open into the axial bore 2. Advantageously, they are distributed uniformly about the periphery of the valve housing 1.

The valve housing 1 is provided on its exterior side with an annular groove which forms an annular channel 4. At the bottom 5 of the annular channel 4 bores 3 are provided. The two sidewalls (6, 7, 9, 10) of the annular channel 4 are stepped. The bottom 5 of the annular channel 4 adjoins the two sidewalls 6 and 7 positioned at a right angle to the bottom 5. The sidewalls 6, 7 are positioned at a spacing to the bores 3. The sidewalls 6, 7 adjoin a step 8 which adjoins further sidewalls 9, 10. The step or bottom 8 is positioned parallel to the bottom 5 but has a greater diameter. The sidewalls 9, 10 which connect the bottom 8 with the exterior side 11 of the valve housing 1 have a greater axial spacing relative to one other than the sidewalls 6, 7.

The step 8 which, when viewed in axial section, adjoins at a right angle the sidewalls 6, 7 and 9, 10, respectively, serves as a support surface for a screen 12 which is embodied as a perforated plate or perforated sheet metal. It has screen openings embodied advantageously as round holes of a diameter in the range between approximately $100 \mu m$ and $300 \mu m$.

This screen 12 is formed of a rectangular strip-shaped band or strap which is bent to a ring. This band or strap when mounted is, for example, snap-connected or welded to the valve housing 1. The axial width of the screen 12 corresponds in the illustrated embodiment approximately to the axial spacing between the sidewalls 9, 10 of the annular channel 4. In this way, the screen 12 in the mounted position is axially secured in the annular channel 4 at a spacing to the bores 3. It is also possible to provide spacer elements on the screen 12 in the area of its two longitudinal edges 13, 14 (not illustrated) with which the screen 12 rests on the support surface 8.

It is also possible to place the screen 12 onto the bottom 5 of the annular channel 4. In this case, the screen 12 is more narrow because the spacing between the sidewalls 6, 7 which are connected by the bottom 5 is smaller than the spacing of the sidewalls 9, 10 to one another.

Since the annular channel 4 rests against the exterior side 11 of the valve sleeve 1, the screen 12 can be mounted easily. If needed, the screen 12 can also be removed in a simple way.

The annular channel 4 can be correlated with a pressure connector P, a tank connector T, or a work connector A, B. It is possible to provide all of the annular channels correlated with these connectors with the screen 12.

Since the screen 12 is made of a perforated plate, it can also be manufactured easily. The perforated plate is stiff in itself so that the screen, contrary to conventional configurations, must not be embedded or enclosed in plastic material by injection molding. The size of the openings in the screen 12 depends on the respective application. The screen size must be selected such that contaminants within the fluid are reliably filtered out.

While specific embodiments of the invention have been shown and described in detail to illustrate the inventive principles, it will be understood that the invention may be embodied otherwise without departing from such principles.

What is claimed is:

1. A valve comprising:
    a valve housing having a flow path for a medium comprising at least one bore;
    at least one screen arranged in the flow path of the medium in the valve housing;
    wherein the at least one screen is a perforated plate having screen openings;
    wherein the valve housing has at least one peripheral annular channel and wherein the at least one screen is a ring arranged in the at least one annular channel.

2. The valve according to claim 1, wherein the at least one screen is made of a strap.

3. The valve according to claim 1, wherein the at least one annular channel is provided on an exterior side of the valve housing.

4. The valve according to claim 1, wherein the at least one annular channel has a support surface and wherein the at least one screen (12) rests against the support surface in the at least one annular channel (4).

5. A The valve according to claim 1, wherein the at least one screen extends peripherally about the at least one annular channel.

6. The valve according to claim 1, wherein the at least one annular channel has sidewalls provided with a step forming a support surface for the at least one screen.

7. The valve according to claim 1, wherein a width of the at least one screen matches an axial width of the at least one annular channel.

8. The valve according to claim 1, wherein the at least one screen is snapped into the valve housing.

9. The valve according to claim 1, wherein the at least one screen is welded to the valve housing.

10. The valve according to claim 1, wherein the at least one annular channel is correlated with at least one of a tank connector, a pressure connector, and a work connector.

* * * * *